(No Model.) 2 Sheets—Sheet 1.

A. R. MANLEY.
FLOUR BIN AND SIFTER.

No. 283,909. Patented Aug. 28, 1883.

Witnesses,
Geo. H. Strong
J. H. Stone

Inventor
A. R. Manley
By Dewey & Co.
Attorneys (No Model.) 2 Sheets—Sheet 2.

A. R. MANLEY.
FLOUR BIN AND SIFTER.

No. 283,909. Patented Aug. 28, 1883.

Witnesses,
Geo. H. Strong.

Inventor,
A. R. Manley
By Dewey & Co.
Attorneys

UNITED STATES PATENT OFFICE.

AARON R. MANLEY, OF SAN JOSÉ, CALIFORNIA.

FLOUR BIN AND SIFTER.

SPECIFICATION forming part of Letters Patent No. 283,909, dated August 28, 1883.

Application filed May 26, 1883. (No model.)

*To all whom it may concern:*

Be it known that I, AARON R. MANLEY, of San José, county of Santa Clara, State of California, have invented an Improvement in Flour Bins and Sifters; and I hereby declare the following to be a full, clear, and exact description thereof.

Figure 1:
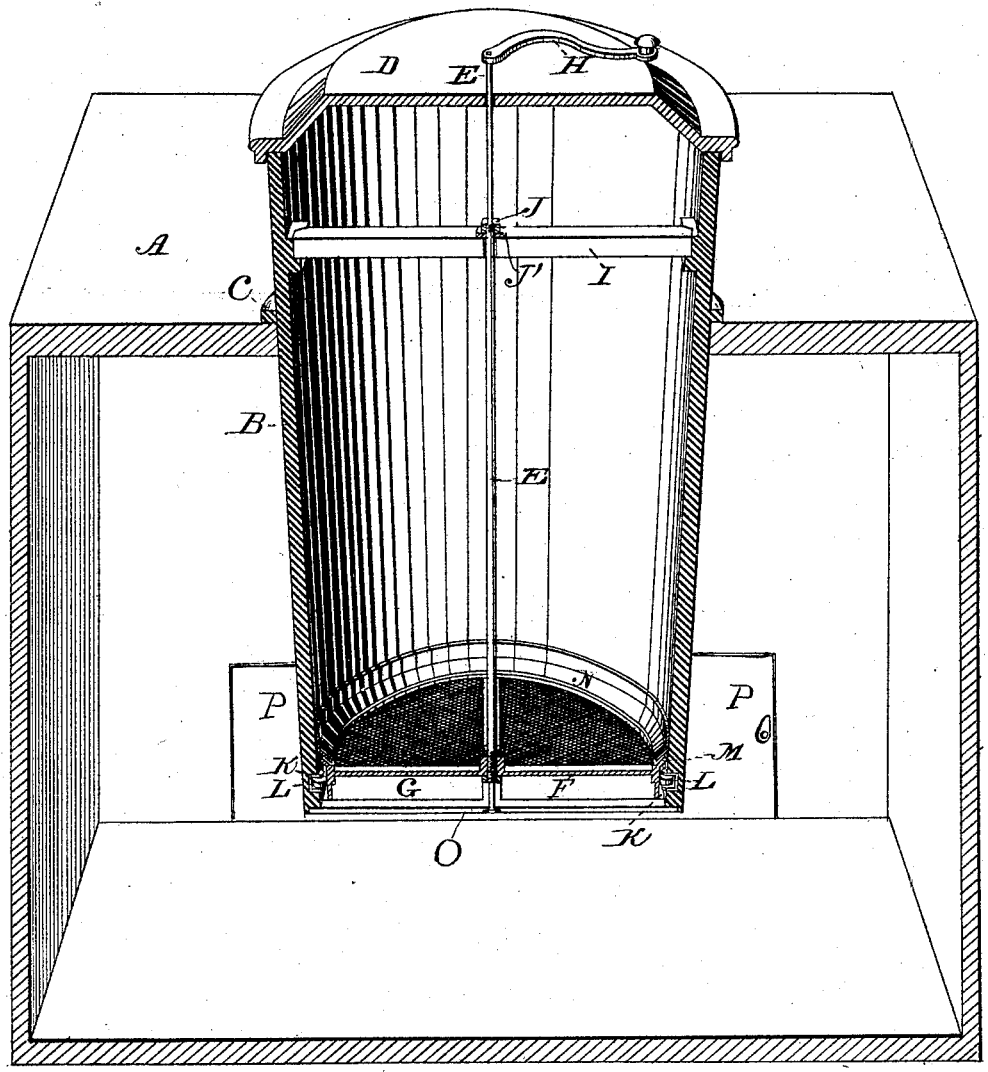
Figure 2:
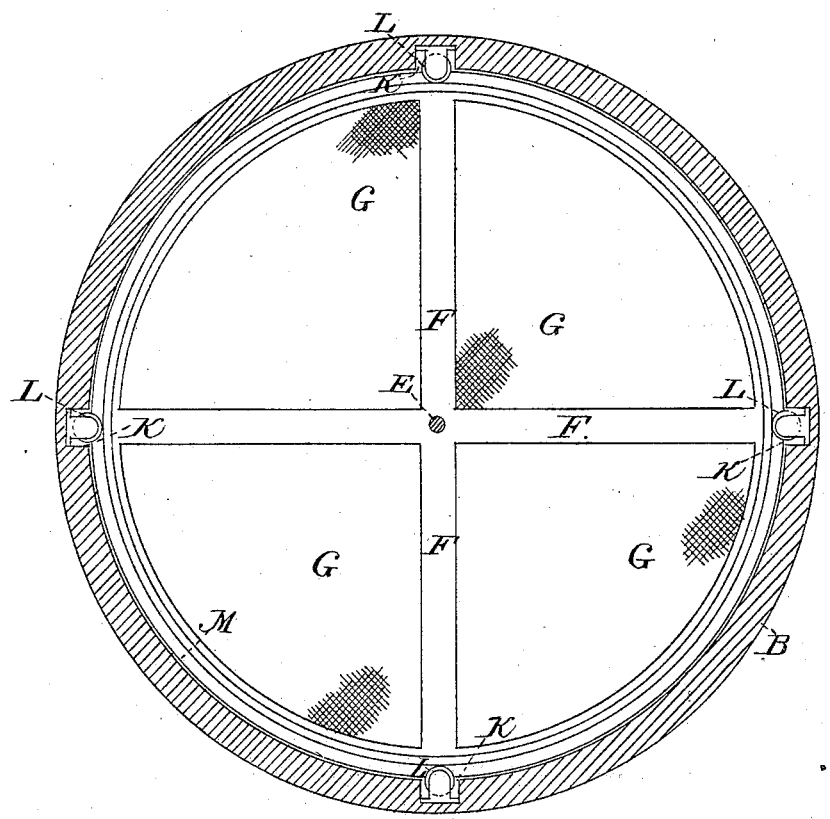
Figure 3:
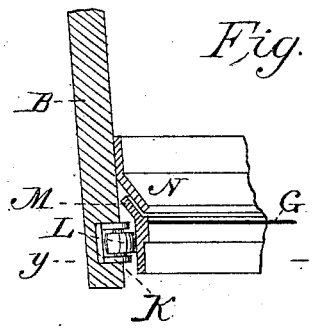

Referring to the accompanying drawings for a more complete explanation of my invention, Figure 1 is a view of a vertical section of my apparatus. Fig. 2 is a plan view of the interior of the sifter. Fig. 3 is an enlarged section, showing the anti-frictional joint and the protecting-flanges.

A is a shelf or box, of any suitable or desired shape and size, having a circular hole cut in its top to receive a cylindrical chamber, B, which has a collar or flange, C, around its outside, to rest upon the top of the bin and support the chamber, with its lower end projecting downward into the bin, as shown. The chamber B has a tight cover, D, through the center of which a vertical shaft, E, passes, and is secured at the bottom in the center of a frame-work, F, which supports a sieve, G.

Upon the upper end of the shaft E is a cranked handle, H, by which it may be turned and the sieve thus rotated.

The chamber B serves as a bin, and may, as above stated, be supported in a perforated shelf, if desired.

A bar, I, is fixed across the upper part of the chamber B, and the shaft E passes through its center and has a collar, J, fixed to it, so as to rest upon a corresponding plate, J', upon the top of the bar, and this supports the weight of the contents of the chamber and relieves the sieve of the pressure, which would cause it to press too heavily upon the bottom supporting-point—a socket in the bar O, which extends across the bottom of the chamber B.

The collar forms a nut and fits into screw-threads upon the shaft, so that it may be adjusted up or down at will to regulate the position of the sieve.

The sieve G may be made of wire-cloth of the desired fineness, and [is stretched over a frame-work, F, which is strong enough to support the weight of the material to be placed in the chamber.

Depressions K are made around the inside of the chamber B, near its bottom, and the periphery of the outside circle of the sieve-frame is opposite these depressions.

Anti-friction rollers L are fixed in these depressions, so that the edge or periphery of the sieve-frame may move over them as the sieve is turned around; or these rollers may be fixed to the sieve-frame and travel upon the inside of the chamber B, the object being to relieve the friction of the parts. In order to protect this joint from being clogged by the contents of the chamber a flange, M, is fixed to the inside of the rim of the sieve-frame and projects upward, inclining outward, as shown, so that its edge runs close to the inside of the chamber B. Just above this flange another one, N, is secured to the inside of the chamber and is inclined inwardly, so as to project down over the flange M, and this practically prevents the entrance of flour so as to clog the moving joint.

The chamber B is made of a size sufficient to contain one or more sacks of flour, which amount may be emptied into it and the cover then placed upon the top, so as to hermetically close it and prevent the entrance of dust or dirt, flies or insects.

When any flour is required for use, it is only necessary to turn the crank at the top, thus rotating the shaft and the sieve, which causes the flour to pass through either into the bin A or into any receptacle which may be placed under the sieve, there being a suitable door, P, in the box A for that purpose.

Having thus described my invention, what I claim as new, and desire to secure by Letters Patent, is—

1. A vertical cylindrical chamber having depressions K and rollers fixed therein, in combination with a rotary sieve-bottom having a circular frame fitting the chamber, as set forth.

2. In a flour-sifter, the chamber B, provided with rollers L, fixed in depressions K in the interior of said cylinder, and the downwardly-inclined flange N, in combination with a rotating sieve-frame fitting said chamber, and having the upwardly-inclined flange M, for the purpose described.

In witness whereof I have hereunto set my hand.

AARON R. MANLEY.

Witnesses:
P. B. SULLIVAN,
D. A. PORTER.